Sept. 16, 1924.
L. R. RUTHENBURG
STEERING WHEEL LOCK
Filed Feb. 23, 1923
1,508,616
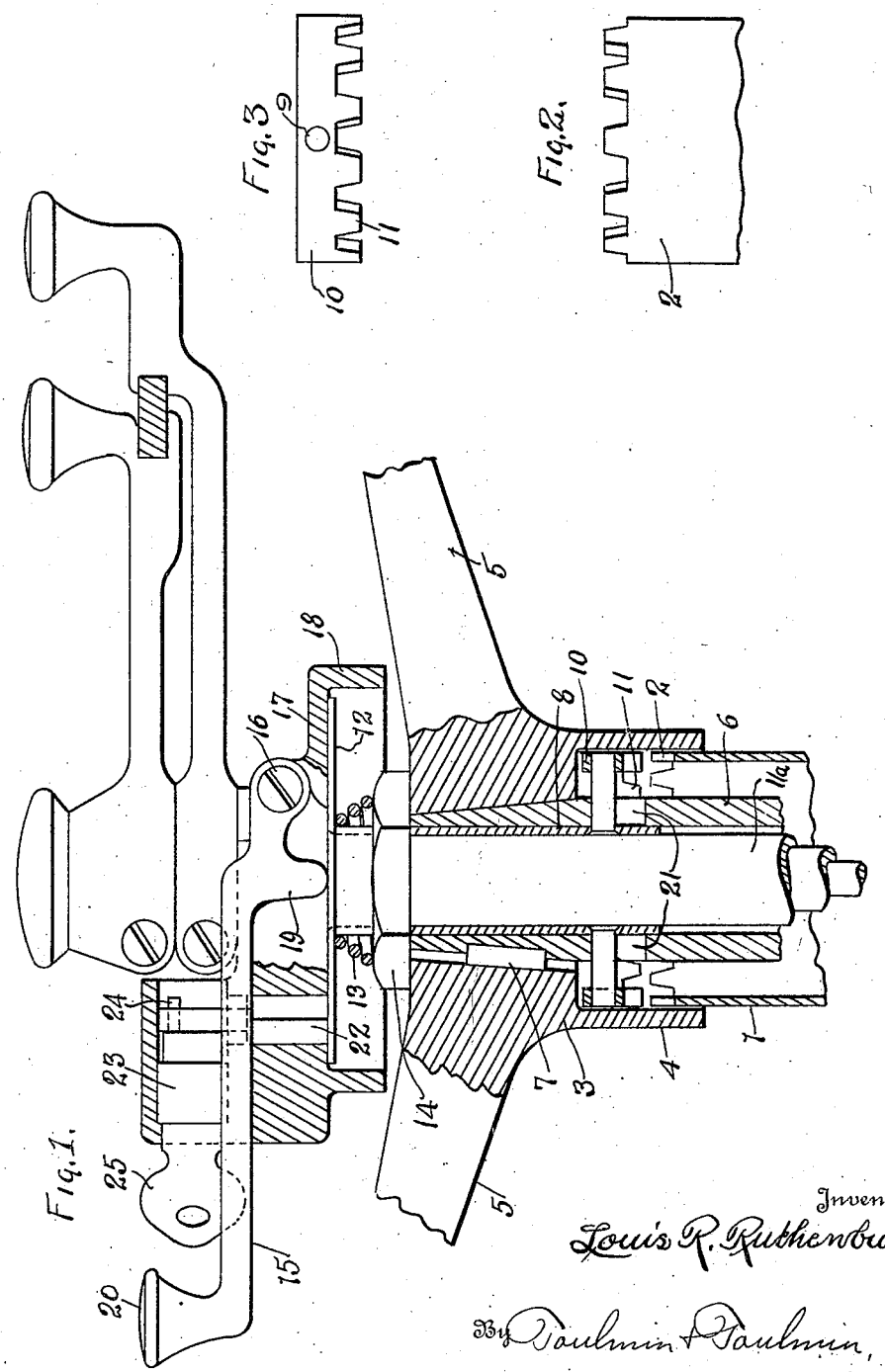

Patented Sept. 16, 1924.

1,508,616

UNITED STATES PATENT OFFICE.

LOUIS R. RUTHENBURG, OF DAYTON, OHIO.

STEERING-WHEEL LOCK.

Application filed February 23, 1923. Serial No. 620,793.

*To all whom it may concern:*

Be it known that I, LOUIS R. RUTHENBURG, a citizen of the United States, residing at Dayton, in the county of Montgomery and State of Ohio, have invented certain new and useful Improvements in Steering-Wheel Locks, of which the following is a specification, reference being had therein to the accompanying drawing.

My invention relates to steering wheel locks.

It is the object of my invention to provide a steering wheel lock which will be positively operative and which may be locked by mechanism above the steering wheel.

It is a further object of my invention to provide a simple and positively acting structure which cannot be tampered with and which will be cheap to manufacture and easily assembled.

It is a further object of my invention to provide such an arrangement of parts that the strain on the lock and its attendant mechanism will be relieved to obviate any damage thereto due to being made with an actuating member as well as a locking member which it is the object of my invention to avoid.

Referring to the drawings, Figure 1 is a side elevation of the assembly of the parts embodying my invention, partially in section.

Figure 2 is a side elevation of the locking tube, and Figure 3 is a side elevation of the locking ring.

Referring to the drawings in detail, 1 is a stationary casing having a plurality of locking teeth 2 on the upper end thereof adjacent to the hub of the steering wheel. This hub 3 of the steering wheel has an overlapping cover 4. 5 are the spokes of the steering wheel. The hub of the steering wheel is mounted upon the steering wheel column 6 and may be attached thereto by any suitable means such as by a key 7. Within the steering wheel column is located a locking tube 8 which carries on the arms 9 a locking ring or annular jaw clutch 10.

This locking ring 10 is provided with locking teeth 11 for engaging with the teeth 2 on the stationary housing 1.

Within the tube 8 is a stationary member 11ª upon which is mounted the stationary element retaining the ignition and throttle assembled controls, a lock and the actuating mechanism for the locking tube.

A locking tube 8 is provided above the steering wheel with an outwardly extending circular flange 12, the under side of which is engaged by spring 13 mounted upon the nut 14. The purpose of this spring is to maintain 8 in its uppermost position and to resist the downward movement of the locking lever 15. This lever is pivoted at 16 on a casing 17 carried by the column 8. The casing is provided with a skirt 18 to conceal the flange 12 and the attendant mechanism and to prevent tampering therewith. This locking lever 15 is provided with an actuating finger 19 and a thumb portion 20. The actuating finger 19 is adapted to engage with the flange 12, when upon pressing the lever 15, the tube 8 will be depressed carrying with it the locking ring 10 so that its teeth 11 may engage with teeth 2 of the stationary tube 1.

As the arms 9 pass through aperture 21 in the steering column 6 this results in the steering wheel being positively locked to the stationary tube 1. This locking is effected by the locking plunger 22, which, upon the tube 8 being depressed with its flange 12, is lowered to the agency of the lock 23 with which it engages by reason of a finger 24 which travels in an eye at the top of 22. This lock 23 is actuated by a key 25.

Thus it is possible to do the actual work of shifting the lock into engaging in locking position through the lever 15, and to effect the actual locking of the mechanism by depressing plunger 22 and locking it with the lock 23.

When this lock is unlocked the plunger 22 is elevated due to the spring 13 forcing upwardly the tube 8 and disengaging the locking ring and the teeth on the tube 1.

While I have shown and described certain features of my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent is:—

1. In combination, a steering wheel and steering column, a stationary member, a means of locking said stationary member and steering wheel and steering column to one another, means of locking said locking means in a predetermined position and means of moving said locking means into a predetermined position independently of the lock, said independently moving means and said lock being located above said steering wheel.

2. In combination, a steering wheel and steering column, a stationary column, and shifting means adapted to interconnect the steering column and stationary column to lock them to one another, means to move said shifting means into a locking position and means to move said shifting means into its unlocked position and means to lock said shifting means into its locked position, said lock and said means for actuating the shifting means to its locked position and means for moving it to its unlocked position being located above the steering wheel.

3. In combination, a steering wheel, a steering wheel column attached thereto and turning therewith, a reciprocating member guided by said steering column and turning therewith in a ring carried thereby surrounding said steering column, said ring having locking teeth thereon, a stationary column with teeth thereon for engaging the first mentioned teeth and means for moving into and out of engagement, said teeth with one another, said means consisting of a lever engaging one end of the shifting means, a casing mounted above said steering wheel covering the free end of the shifting means and having mounted therein a lock and locking plunger maintaining the shifting means in its locked position.

4. In combination, a steering wheel, a steering column turning therewith, a stationary column therein, a shifting tubular member adapted to slide vertically therebetween having arms projecting through apertures in said steering column, locking ring with locking teeth thereon carried on the ends of said arms surrounding said column, a stationary casing with teeth thereon adapted to engage with the teeth on said locking ring, yielding means mounted on said stationary column for maintaining the shifting means in its unlocked position, a casing carried by said stationary column, a lever pivoted thereon for moving the shifting means into its locked position, a plunger therein to maintain said shifting means in its locked position and a lock for locking said plunger into a locked or unlocked position.

In testimony whereof I affix my signature.

LOUIS R. RUTHENBURG.